Oct. 16, 1951     L. R. KAHN ET AL     2,571,368
AIRCRAFT RADIO RANGE SYSTEM
Filed March 11, 1949
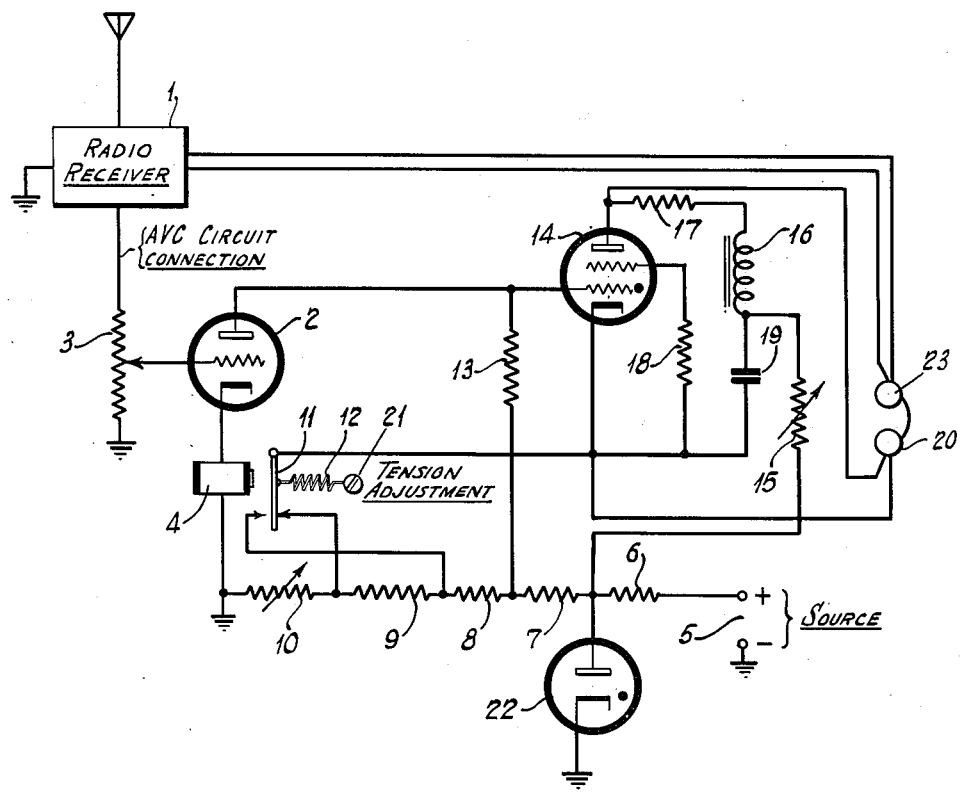
INVENTORS
LEONARD R. KAHN.
DONALD S. SANFORD.
BY
Ralph W. Bumstead
ATTORNEY.

Patented Oct. 16, 1951

2,571,368

UNITED STATES PATENT OFFICE 2,571,368

AIRCRAFT RADIO RANGE SYSTEM

Leonard R. Kahn and Donald S. Sanford,
New York, N. Y.

Application March 11, 1949, Serial No. 80,892

16 Claims. (Cl. 343—101)

1

This invention relates to air navigation aids and more particularly to a new and improved aircraft radio range system wherein the pilot or navigator is enabled to listen to variations of a tone-frequency signal and to translate them into an indication of approach to or departure from a certain radio transmitter, such as a radio beacon.

Under average conditions of air navigation it is found that the ambient noise is quite large, being close to 60 db. above the threshold of audibility. At 70 db. above that threshold the noise level is the same as that of a busy street. It follows, therefore, that in order to make efficient and comfortable use of a listening device connected to a radio beacon, the volume level should be restricted to a range which does not fall appreciably below 60 db. and does not rise appreciably above 70 db., otherwise, at the low limit the useful signal is blanketed by noise, and at the high limit the sound becomes painful, or at least uncomfortable.

Referring to a book by Stevens & Davis, entitled "Hearing", and published in 1938 by John Wiley and Sons, Inc. of New York, N. Y., page 153, it is there stated in effect that if one listens to a tone signal of 1000 cycles and if this signal is varied in intensity between 60 db. and 70 db., the number of discriminable steps of amplitude variation is about 25. But if the amplitude of the signal is held at 60 db. and is varied in frequency between 20 cycles and 20,000 cycles the number of discriminable tone frequency differences which the human ear can detect is approximately 1800. It is evident, therefore, that the human ear is much more sensitive to variations of tone frequency than to variations of intensity. From the figures given above on discriminable steps it is indicated that under normal conditions of air navigation the human ear is approximately 72 times more sensitive to variations of tone frequency than to variations of intensity of the signal.

In carrying out our invention, we take advantage of the difference in sensitivity of the ear with respect to frequency changes as compared with its sensitivity to volume intensity changes. Therefore our apparatus is designed to translate amplitude variations of signal reception into tonal variations.

Accordingly, it is an object of our invention to provide a novel radio range system in combination with a conventional radio receiver, the combination being adapted to provide an air navigation aid which develops variations of a tone frequency as a function of the amplitude of the received signal.

2

Another object of our invention is to provide means whereby an aircraft navigator may sense his approach to a landing field or his departure therefrom by listening to a tone signal which varies in frequency as a function of the amplitude of the received signal, assuming that he is following a radio beam.

Still another object is to provide means automatically operable upon near approach to a landing field whereby the relationship is changed between a given amplitude value of the received signal and the tone frequency into which it is translated. The achievement of this object enables us to maintain the frequency of an oscillator within a narrower band than would otherwise be required. In effect, the range of the oscillator is doubled by causing its frequency to drop after it reaches a high tone and to go through the same range of frequencies a second time upon reception of signals at a high volume level.

Our invention will now be described in more detail, reference being made to the accompanying drawing, the sole figure of which represents a preferred embodiment of the invention.

Referring to the drawing, we show a radio receiver 1 which is of conventional type and which comprises an automatic gain control circuit. A connection to this circuit is labeled AVC Circuit Connection and is shown having a potentiometer 3 which is also connected to ground. The purpose of this potentiometer is to vary the supply of control voltage for the D. C. amplifier tube 2. The D. C. power source 5, which is used for operation of our equipment has its positive terminal connected through a series of voltage divider resistors 6, 7, 8, 9 and 10 to ground. The anode of tube 2 is fed with positive potential through resistors 6 and 7 of the voltage divider and thence through a resistor 13. The cathode of tube 2 is connected to ground through the winding of a relay 4, the function of which will be explained presently.

We show an oscillator tube 14 which is preferably the type known as 2D21. It is a tetrode and a gaseous tube. The first grid is directly connected to the anode of tube 2. The second grid is connected to the cathode of tube 14 through a resistor 18 which, for example, may have a value of ½ megohm. The anode of tube 14 is fed with a potential from the positive terminal of the D. C. source 5 through a circuit which includes potentiometer 15, an inductive reactance coil 16 and a resistor 17. The cathode of tube 14 is connected through the relay armature 11 to one or the other of its associated contacts, these contacts being connected to different junction points between resistors 8, 9 and 10 of the aforementioned voltage divider.

A time-constant circuit forming a connection between the cathode and anode of tube 14 includes a capacitor 19 and the aforementioned inductive reactance coil 16. Capacitor 19 takes a periodic charge through potentiometer 15, the latter being manually adjustable in order to determine the frequency range of the oscillations generated by tube 14. After such adjustment the precise frequency depends upon the control potential applied to the first grid and depends also upon the cathode bias as determined by the operation or non-operation of relay 4.

In order to translate a wide range of signal intensity variations into variations of the generated frequency of output from tube 14, without unduly extending the frequency band itself, the relay 4 serves to produce a recycling effect on the oscillator. Thus, when the intensity of the signal rises to a predetermined value the relay operates and shifts the connection of the cathode in tube 14 to a more positive voltage divider tap (between resistors 8 and 9) than the tap to which the back contact of relay 4 is connected. The resultant tone is then shifted to the low limit of the frequency band for this generator and again climbs toward the high limit with further dynamic increases of the received signal. Obviously this principle may be extended by relay means such as would facilitate connection of the cathode of tube 14 selectively to any one of three or more points along the voltage divider. In this way the recycling of the unit may be repeated a number of times.

One of the earpieces 20 of a set of head phones is connected between the cathode and anode of tube 14 in order to hear the frequency of the oscillations generated.

In order to maintain a constant operating voltage for the oscillator tube 14, a voltage regulator tube 22 is provided. This may be of the type known as VR150. Its cathode is grounded and its anode is connected to the junction between resistors 6 and 7.

In an embodiment of our invention which has actually been constructed and its operating characteristics satisfactorily proven, we chose certain values for the components as above described, which may now be stated by way of example, but without limiting ourselves to the use of such values.

Resistor 6, 5000 ohms
    Resistor 7, 5000 ohms
    Resistor 8, 2000 ohms
    Resistor 9, 5000 ohms
    Resistor 10, 3000 ohms maximum
    Resistor 13, .5 megohm
    Resistor 15, 3 megohms maximum
    Resistor 17, 100 ohms
    Inductance 16, 16 millihenries
    Capacitor 19, .004 microfarad
    D. C. source 5, 240 volts The operation of our invention will now be described: Variations of signal strength of the received beacon signal may, of course, be heard through one earpiece 23 of the head set, this earpiece being directly connected to the output terminals of the receiver's audio amplifier. The radio beam is usually keyed with an identification code every minute, and the A—N signal characterizes the left and right sectors of the beam and gives a guide path at the center of which the A-code and the N-code are interlaced so as to deliver a steady tone. If one flies in the beam, it is not always easy to determine which way to go in order to approach the beacon and also when one has passed the beacon. But when, in a very brief period of flying, the increase or decrease in signal intensity can be observed to produce a different tone of output from the oscillator, it will be apparent that the pitch of the tone signal and its higher or lower trend can be much more quickly noted than a change of signal volume.

The ignition voltage across the space path of tube 14 varies as a function of the voltage on the first grid, which voltage is also varied by the output from the D. C. amplifier 2 in response to signal strength variations. When the ignition voltage is reduced this shortens the charging time for the capacitor 19. Hence the frequency of the oscillator is raised to a higher pitch with increase in signal amplitude. It should be noted that the circuit could be designed to lower the pitch with increased signal strength. Ionization in tube 14 ceases as soon as the voltage drop through the tube is reduced to less than 10 volts, that is upon discharge of the capacitor 19. The ignition voltage is considerably higher than the extinction voltage, so that, disregarding the voltage drop through the inductance 16 and the resistance 17, the voltage across the capacitor 19 will have a range above 10 volts and up to the ignition voltage of the tube 14, the charge being built up to that value during each oscillatory cycle. Hence the amount of the capacitor charge is made subject to the control of the ignition voltage by the variations of signal intensity, and the frequency of the relaxation oscillations is readily heard in the earpiece 20.

When the amplitude of the received signal reaches a certain predetermined limit the current through the tube 2 and through the winding of relay 4 causes this relay to operate. Its armature 11 is pulled up against the retracting power of spring 12. This shifts the cathode potential in tube 14 to a higher value. This cathode potential in relation to the bias on the first grid is now such that the tube oscillates at the lowest operating frequency and is ready to sweep over the tone range once more.

The anchorage 21 for the draw-back spring 12 that is connected to the armature of relay 4 is indicated as a tension adjustment. This showing is made on the drawing merely to symbolize the provision of any suitable adjustment of the critical point at which the relay 4 will operate on increase of its attractive force. In practice this adjustment is usually made merely by a "setting" of the flexure bias on the contact springs. Another adjustment of the relay operating point is also obtained by movement of the tap along the potentiometer 3.

The inclusion of the inductive element 16 in the anode circuit of the oscillator is not absolutely essential, but the operation of the circuit is improved thereby, since it offers sufficient impedance to the discharge current to relieve both the tube 14 and the capacitor 19 of undue electrostatic stresses. It also improves the quality of the tone signal as heard in the earpiece 20 by making it less rasping. In other words, the saw-tooth wave of the oscillations is somewhat rounded off at the sharp peaks.

It will be readily understood by those skilled in the art, that our invention may be embodied in apparatus which is of light weight and relatively few components, so it can be carried aboard the smallest of airplanes. It will be remembered that the circuit as shown in the diagram provides an increase of tone frequency with a more negative shift of automatic gain control potential so that when the aircraft approaches a landing field or the range antenna, the tone rises to a higher pitch. When the aircraft is going away from the landing field, the tone is lowered.

From the foregoing description, it will be appreciated that variations may be made in the structural details of the equipment to suit different requirements. The scope of the invention is, therefore, as broad as is permitted by the definition of the claims to follow.

We claim:

1. In an aircraft radio range system, the combination of an oscillator supplemental to the radio receiver circuit and operable to deliver an output in the audio range, a direct current amplifier for varying the frequency of the oscillator throughout an uninterrupted frequency band as a function of the variable intensity of a signal as received by said radio receiver, means connected to the automatic gain control circuit of said receiver for varying the anode potential in said amplifier, and means for enabling a listener to hear simultaneously the audio output from said receiver and the pitch of the tonal output from said oscillator.

2. The combination according to claim 1 and including voltage regulator means for maintaining a constant value of the direct current potential as applied to the circuit of said oscillator.

3. The combination according to claim 1 and including means operable when the automatic gain control potential rises to a predetermined value for shifting the cathode potential in the tube of said oscillator to a more positive voltage level.

4. The combination according to claim 1 and including separate earpieces in the means last stated, one of said earpieces being connected to said receiver to respond to its audio output, and the other of said earpieces being connected to the output circuit of said oscillator.

5. In a device for translating variations of signal amplitude into variations of frequency, the combination of an oscillation generator having a gaseous discharge path, and circuits for controlling the output frequency, a signal receiver having an automatic gain control circuit, a connection between said gain control circuit and one of the frequency control circuits, audio-responsive means connected to said generator to receive its output, another audio-responsive means connected to said signal receiver to reproduce the signal itself, and means automatically operable when the signal amplitude rises above a predetermined level for causing a re-cycling of the frequency range of the oscillations generated.

6. An oscillation generator in combination with a signal receiver having an automatic gain control device and means coupled to said device for gradually varying the frequency of the generated oscillations as a function of the amplitude of the received signals, said generator being of the type which produces relaxation oscillations by virtue of its capability for offering a discharge path to an associated capacitor and for determining the periodicity of the discharges in dependence upon a control potential derived from said automatic gain control device, and audio responsive means having separate connections, one to the output circuit of said signal receiver and the other to electrodes at opposite ends of said discharge path.

7. The combination according to claim 6, wherein the first said means includes a direct current amplifier having an input circuit connected to said gain control device and an output circuit for delivering a variable control potential to said generator.

8. The combination according to claim 6, wherein the first said means includes a relay the winding of which is in circuit with the discharge path of a direct current amplifier, said relay having contacts through which direct current potentials of different values may be fed to the cathode of said oscillation generator according to the instant range of amplitude of the received signals above or below a predetermined marginal point of relay operation.

9. In an aircraft radio range system, the combination of an oscillator supplemental to the radio receiver circuit and operable to deliver an output in the audio range, a responsive device for listening to the pitch of the tonal output from said oscillator, means including the automatic gain control circuit of said receiver and a direct current amplifier wherein the anode potential is gradually varied as a function of the variable intensity of signal reception, said means being operable for controlling the frequency of said oscillator, and means in circuit with the space path of said amplifier and operable when said anode potential drops below a predetermined value for shifting the cathode potential in the tube of said oscillator to a more positive range of values.

10. In a signaling system, the combination of a radio receiver operable to deliver a signal-responsive output in the audible range, an oscillator, control means for gradually varying the frequency of said oscillator in dependence upon intensity variations of signals to which said receiver responds, and means for causing a re-cycling of the frequency variations of said oscillator between the upper and lower limits of a given frequency band when the intensity of the received signals exceeds a predetermined value.

11. A system according to claim 10, wherein said means is constituted as a switching device having a marginal response to received signal intensities.

12. Apparatus for indicating an approach to, or departure from, a beacon transmitter, as made by an airborne radio receiver, comprising in combination with an automatic gain control circuit which is a component of said receiver, a relaxation oscillation generator, means including an amplifier of direct current output from said gain control circuit for causing the frequency of said generator to be gradually varied as a function of the amplitude of the radio frequency energy to which said receiver is receptive, means automatically operative when said energy amplitude exceeds a predetermined value for shifting the range of frequency variations of said generator to a lower frequency band, and means for producing an audible response to the output from said generator.

13. In combination, a radio receiver having a gain control circuit the output energy from which varies as a function of the radio frequency energy to which said receiver responds, an oscillation generator the frequency of which is subject to gradual variation under control of said output energy, means for producing an audible response to the output from said generator, and separate means for simultaneously obtaining an audible signal response directly from said radio receiver.

14. Apparatus for producing a gradually variable indication of the output signal level from a radio receiver supplemental to the direct audio output therefrom, said apparatus comprising an oscillation generator, means for deriving from said receiver a direct current control potential the amplitude of which varies as a function of said signal level, means for varying the frequency of said generator in accordance with said potential amplitude, and means for translating the output from said generator into a sound of variable pitch.

15. Apparatus for translating variations of signal amplitude at different distances from a radio transmitter into gradual variations of frequency of a wave generated at the locus of signal reception, said apparatus comprising means operatively associated with the circuit for said signal reception for generating said wave, means for controlling the frequency of the wave as a function of said signal amplitude, and means for producing simultaneous audible responses both to the generated wave and to the signal itself.

16. In an aircraft radio range system, the combination of an oscillator supplemental to the radio receiver circuit and operable to deliver an output of variable pitch in the audible range, means in said receiver circuit sensitive to variations of received signal intensity, this means being operable to gradually vary the pitch of said oscillator as a function of said signal intensity, and means for translating the output from said oscillator into an audible sound.

LEONARD R. KAHN.
DONALD S. SANFORD.

REFERENCES CITED

The following references are of record in the file of this patent:

UNITED STATES PATENTS

| Number | Name | Date |
|---|---|---|
| 1,489,158 | Schaffer | Apr. 1, 1924 |
| 1,968,750 | Edwards | July 31, 1934 |
| 2,208,377 | Luck | July 16, 1940 |
| 2,251,997 | Goldmann | Aug. 12, 1941 |

OTHER REFERENCES

Wagner, abstract of application S. N. 641,162 published Aug. 16, 1949, 625 O. G. 839.